Figure 4:
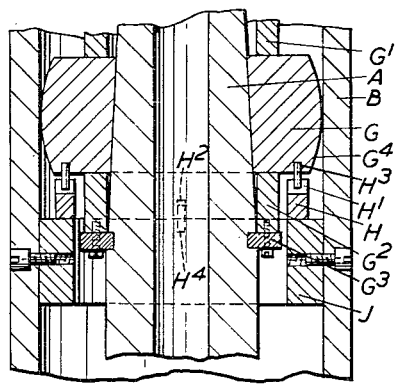

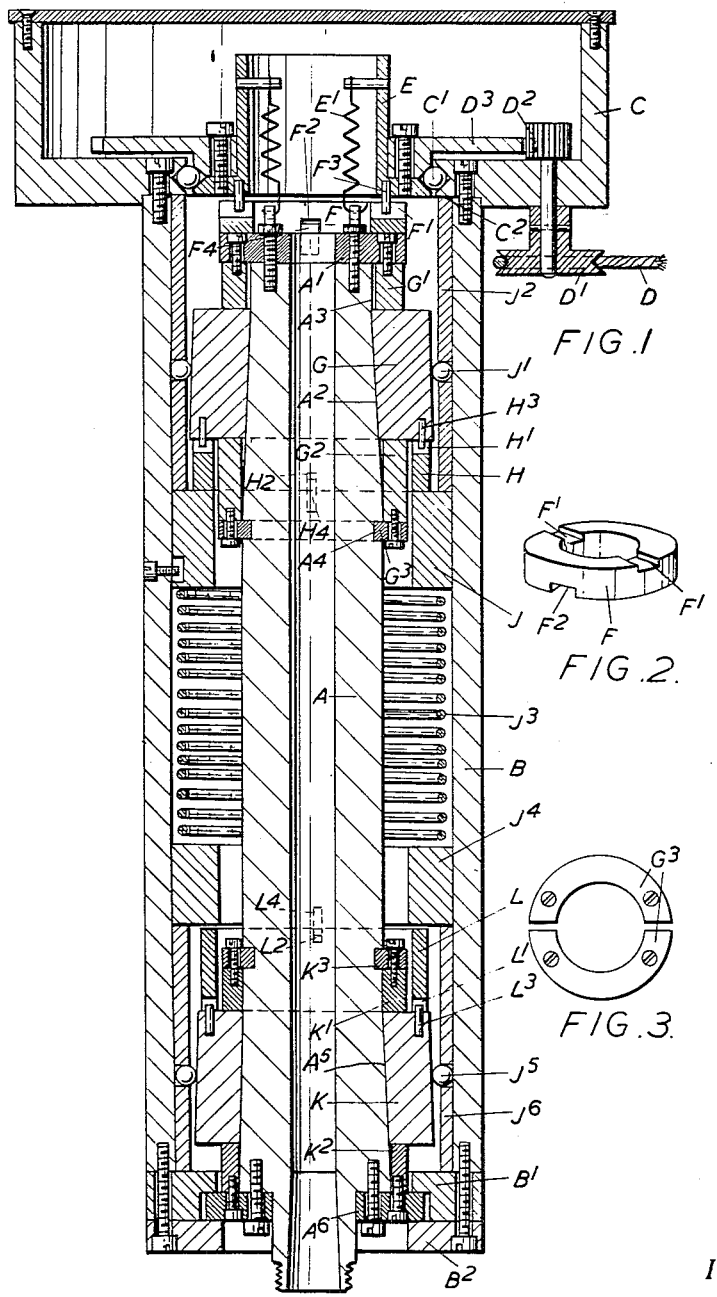

United States Patent Office 2,741,517
Patented Apr. 10, 1956

2,741,517

SPINDLE MOUNTINGS

Richard Edmund Reason, Leicester, England, assignor to Kapella Limited, Leicester, England, a British company Application June 15, 1953, Serial No. 361,719

Claims priority, application Great Britain June 18, 1952

20 Claims. (Cl. 308—140)

This invention relates to a spindle mounting, for use in a machine or a measuring instrument, for example an instrument for measuring or testing the roundness of a surface, and has for its primary object to provide a spindle mounting such that the position of the axis of rotation of the spindle is maintained constant in space with a high degree of accuracy.

An accurate spindle mounting has been proposed in which the spindle is supported at each end by bearing means consisting of cooperating slightly tapered bearing surfaces on the spindle and on a bearing member which is held against rotation in a fixed hollow housing or quill surrounding the spindle. My Patent No. 2,701,170, dated February 1, 1955, relates to another form of accurate spindle mounting, in one embodiment of which the spindle is journalled at one end in a taper bearing of this kind and at the other end in a spherical bearing.

In both such prior arrangements, the bearing member carrying one of the cooperating tapered bearing surfaces is located in the correct axial position by means carried by the housing or quill. A more detailed object of the present invention is to provide an improved taper bearing of the above-described kind, wherein the bearing member can be axially located in the correct position with greater precision than in such prior arrangements.

The accurate spindle mounting according to the present invention comprises a rotary spindle, a fixed hollow housing surrounding the spindle and bearing means for radially locating the spindle in the housing and for axially constraining the spindle, such bearing means including at one end of the spindle a taper bearing device consisting of cooperating slightly tapered bearing surfaces on the spindle and on a bearing member carried thereby, means carried by the spindle for effecting accurate axial positioning of the bearing member thereon, and means for locating the bearing member in the housing whereby it is held against rotation therein but is free to move axially relatively thereto. The included angle of the taper should be small and of the order of a few degrees only, usually less than 3 degrees.

The locating means for the bearing member of the taper bearing device is preferably arranged to permit slight angular movement of the bearing member to accommodate any slight inaccuracy in alignment of the taper axis with the axis of rotation of the spindle. In one such arrangement, the bearing member is radially located in the hollow housing by means of a ring of balls in a cage in the housing. In another arrangement the bearing member has a spherical external surface closely fitting within the housing.

For holding the bearing member against rotation relatively to the housing, it is preferable to employ a balanced coupling incorporating a floating member such as to permit slight relative axial movement between the bearing member and the housing but to eliminate or minimise radial stresses.

The bearing device at the other end of the spindle may also consist of a taper bearing device generally similar to that at the first end, the axial thrust in such case being taken by an axial thrust bearing separate from the two bearing devices. Alternatively, the bearing device at such other end may serve not only to effect accurate radial location of the spindle in the housing, but also to afford an axial thrust bearing for the spindle. Thus, the bearing device at such other end may consist of cooperating spherical bearing surfaces respectively on the spindle and on the housing.

It will usually be convenient to mount the spindle vertically and to support at least part of its weight by a spring connected to a driving member, from which the spindle is driven through a balanced coupling (such as an Oldham's coupling) so as to be subjected only to a rotational torque.

The invention may be carried into practice in various ways, but some convenient alternative constructions of spindle mounting according thereto are illustrated in the accompanying drawings, in which Figure 1 is an axial sectional view of one construction, Figures 2 and 3 are detached views of parts used in the construction of Figure 1, and Figures 4, 5 and 6 are partial sectional views respectively illustrating three further constructions.

In these constructions, the spindle A is mounted vertically within a cylindrical hollow housing B, which may conveniently be termed a "quill" and is rigidly suspended from a casing C containing the driving mechanism, for the spindle. The spindle A itself consists of a hollow rod, having a flange $A^1$ attached to its upper end to which the drive is applied. The drive is obtained from a suitable source through transmission mechanism shown as a belt D and pulley $D^1$ and through gearing $D^2$, $D^3$ housed in the casing C to a driving member E rotatable in ball bearings $C^1$ in the casing C, and thence to the spindle through an Oldham's coupling. This coupling comprises a disc F (shown separately in Figure 2) provided on its upper side with two slots $F^1$ at opposite ends of a diameter and on its lower side with another pair of slots $F^2$ displaced by ninety degrees away from the slots $F^1$. Pins $F^3$ carried by the driving member E engage in the slots $F^1$ and further pins $F^4$ carried by the flange $A^1$ on the end of the spindle engage in the slots $F^2$. This arrangement ensures that no force other than a true rotational torque about the spindle axis is transmitted to the spindle from the driving mechanism.

A portion of the axial thrust due to the weight of the spindle and of parts connected to it, is relieved by means of springs $E^1$ anchored at one end to the driving member E and at the other end to the spindle A, part of the axial thrust thus being taken by the ball bearings $C^1$ in the upper casing C.

The various constructions differ from one another in the arrangement of the bearing means for the spindle A in the quill B. In each case, however, as shown in Figure 1, the bearing device at the upper end of the spindle A is in the form of a taper bearing. Thus the upper end of the spindle is formed at $A^2$ with a very slight taper, for example having an included angle between one and two degrees, with a short cylindrical portion $A^3$ between such taper and the end flange $A^1$ through which the drive is applied to the spindle.

A bearing member G, in the form of a sleeve having its inner surface correspondingly tapered, surrounds the tapered portion $A^2$ of the spindle and is held in the correct position thereon by a pair of annular spacers $G^1$ $G^2$ abutting against (and bolted or clamped to) shoulders on the spindle. Thus the upper spacer $G^1$ abuts against and is bolted to the flange $A^1$, whilst the lower spacer $G^2$ similarly engages with an annular disc $G^3$ formed in two halves (as shown in Figure 3) and engaging in a groove $A^4$ around the spindle. It is important that the annular spacers $G^1$ $G^2$ should be accurately worked to the correct axial dimensions to ensure that the bearing member G should be in the correct axial position to give exactly the right thickness for the oil film between the coacting tapered surfaces. The fact that the axial location of the bearing member G is effected according to the present invention by means carried by the spindle A itself, so that the bearing member can be finally assembled in its correct position on the spindle before the spindle is inserted in the quill B, makes it possible readily to achieve this high degree of accuracy. Whilst other means, such for example as accurately made screwthreaded parts, could be used for effecting this axial positioning of the bearing member G, the arrangement described is especially advantageous, since it avoids applying any radial forces to the spindle which might cause distortion and therefore inaccuracy and shake in the rotation.

The bearing member G must be held against rotation in the quill B, and here again it is desirable to employ a keying arrangement such as to avoid introducing any radial component of the frictional torque. For this purpose it is preferable to use a balanced coupling (such as an Oldham's coupling) having an intermediate floating member H between the bearing member G and the quill B, such coupling being arranged to leave the bearing member free for slight axial movement relatively to the quill so that it is not subjected to any axial thrust and can move to accommodate relative expansion or contraction of the parts due to temperature changes. The intermediate floating member H has pairs of slots $H^1$ and $H^2$ in it in the same manner as the disc F, and pins $H^3$ carried by the bearing member G engage in the slots $H^1$, whilst pins $H^4$ engaging in the slots $H^2$ are carried by an axially slidable ring J keyed to the quill B.

It is also necessary to ensure accurate radial location of the bearing member G in the quill B, and the means for effecting this should be such as to permit slight angular movement of the bearing member during the rotation in order to accommodate any slight inaccuracy there may be in alignment of the taper axis with the axis of rotation. This can be achieved in various ways.

In one arrangement, as shown in Figure 1, the outer surface of the bearing member G has a slight taper and engages with a ring of balls $J^1$ mounted in a cage $J^2$ which is pressed by a spring $J^3$ against a shoulder $C^2$ in the casing C, the axial distance between the shoulder $C^2$ and the ring of balls $J^1$ being accurately determined to ensure that the tapered outer surface of the bearing member G will properly engage with the balls $J^1$. The slight clearances of the balls in the cage $J^2$ will usually be adequate to accommodate any slight axial movement of the bearing member G relatively thereto.

In another arrangement, shown in Figure 4, the bearing member G has a spherical outer surface $G^4$ of just the right size to fit closely within the cylindrical inner surface of the quill B, the ball cage being omitted. The ring J in this case is fixed to the quill, instead of being axially slidable therein, the arrangement otherwise being similar to that of Figure 1.

The bearing device at the lower end of the spindle A, in the construction of Figure 1, also consists of a taper bearing, arranged generally similarly to that above described for the upper end, the tapers $A^2$ and $A^5$ at the two ends of the spindle both facing in the same direction, that is both narrowing upwards. Thus, a bearing member K engages with the lower taper $A^5$ on the spindle and is axially located thereon by two spacers $K^1$ and $K^2$ respectively abutting against and bolted to a divided annular ring $K^3$ (like the divided ring $G^3$) and a flange $A^6$ secured to the lower end of the spindle. The bearing member K is held against rotation by means of an Oldham's coupling comprising a floating ring L connected through slots $L^1$ and pins $L^3$ to the bearing member K and by slots $L^2$ and pins $L^4$ to an axially slidable ring $J^4$ with which the other end of the spring $J^3$ engages. The outer surface of the bearing member K engages with a ring of balls $J^5$ in a cage $J^6$ pressed by the spring $J^3$ against an inwardly directed flange $B^1$ secured to the bottom of the quill B.

With this arrangement, since the two taper bearings are not designed to take any axial thrust, it is necessary to provide in addition an axial thrust bearing for the spindle. This axial thrust bearing may be disposed at any convenient point in the length of the spindle, for example at the lower end thereof, and may take any convenient form. Thus, in one arrangement shown in Figure 1, the thrust bearing consists of a flange on the spindle, for example the flange $A^6$ fitting between two shoulders on the quill, one of which is formed on the flange $B^1$ whilst the other consists of a second flange $B^2$ also bolted to the quill, the space between the two shoulders being slightly larger than the thickness of the flange $A^6$ to accommodate an oil film of satisfactory thickness between each side of the spindle flange $A^6$ and the associated shoulder on the quill.

Figure 5:
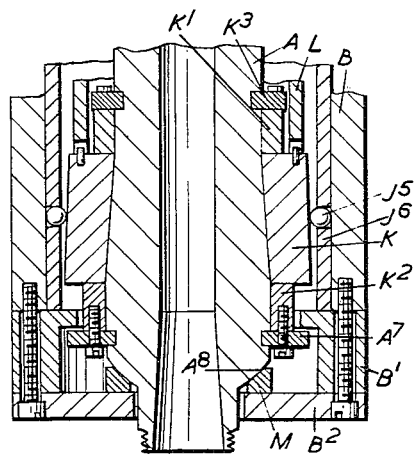

Alternatively, as shown in Figure 5, the flange $A^6$ on the spindle may be replaced by a divided ring $A^7$ abutting with slight clearance against the shoulder on the quill flange $B^1$, and the thrust bearing may take the form of a self-aligning ring M engaging between a spherical surface $A^8$ on the spindle and the flat surface of the second flange $B^2$ on the quill.

Figure 6:
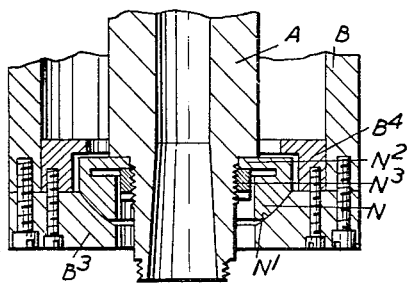

In the alternative construction shown in Figure 6, the bearing device at the lower end of the spindle is in the form of a spherical bearing, arranged in the manner described in the specification of the Patent No. 2,701,170 above mentioned, so that it will act not only as a rotational bearing but also as an axial thrust bearing. In one convenient construction, as shown, an annular bearing member N having a spherical outer surface $N^1$ is secured to the spindle, for example by means of a flange $N^2$ on the member N clamped against a shoulder on the spindle by means of a nut $N^3$, so that the centre of the spherical surface $N^1$ is accurately in alignment with the spindle axis, such surface cooperating with a mating spherical surface on an annular flange $B^3$ secured to the lower end of the quill B. The upper surface of the bearing member N abuts with slight clearance against a shoulder on a ring $B^4$ secured to the quill B.

In all these constructions, suitable arrangements are provided in the well-known manner for ensuring a proper supply of oil to the various bearing surfaces to maintain the oil films.

What I claim as my invention and desire to secure by Letters Patent is:

1. An accurate spindle mounting for precision work comprising a rotary spindle having at one end a slightly tapered bearing surface, a bearing member carried by the spindle and having a slightly tapered bearing surface in bearing engagement with the tapered bearing surface on the spindle, means carried wholly by the spindle for effecting accurate axial positioning of the bearing member on the spindle whereby the bearing member is prevented from moving axially in both directions relatively to the spindle, a fixed hollow housing surrounding the spindle and the bearing member, locating means in the housing permitting limited axial movement of the bearing member for radially and circumferentially positioning the bearing member in the housing, such locating means including radially abutting parts coacting in a single transverse plane between the bearing member and the housing whereby the bearing member is substantially held against radial movement in the housing but is left free for slight axial or tilting movement relatively thereto and circumferentially abutting parts in sliding engagement between the bearing member and the housing whereby the bearing member is held against rotation in the housing but is left free for slight axial or tilting movement relatively thereto, and bearing means in the housing for the other end of the spindle.

2. A spindle mounting as claimed in claim 1 in which the locating means includes in addition to the radially abutting parts for radially locating the bearing member, a balanced coupling for holding the bearing member against rotation relatively to the housing, such coupling incorporating a floating member and means for coupling such member to the bearing member and to the housing whereby slight relative axial movement between the bearing member and the housing is permitted and radial stresses are minimized.

3. The combination with the features claimed in claim 2, of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

4. A spindle mounting as claimed in claim 1, in which the locating means includes in addition to the circumferentially abutting parts for holding the bearing member against rotation, a ball cage carried by the housing, and a ring of balls housed in such cage and abutting radially against the bearing member, whereby the bearing member is located radially in the housing, but is left free for slight axial or tilting movement relatively thereto.

5. The combination with the features claimed in claim 4, of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

6. A spindle mounting as claimed in claim 1, in which the locating means comprises a ball cage carried by the housing, a ring of balls housed in such cage and abutting radially against the bearing member, whereby the bearing member is located radially in the housing but is left free to slight axial or tilting movement relatively thereto, and a balanced coupling in the housing for holding the bearing member against rotation relatively thereto, such coupling incorporating a floating member and means for coupling such member to the bearing member and to the housing whereby slight axial or tilting movement of the bearing member relatively to the housing is permitted and radial stresses are minimized.

7. A spindle mounting as claimed in claim 1, in which the locating means includes in addition to the circumferentially abutting parts for holding the bearing member against rotation, a spherical surface on the bearing member abutting radially against a surface of the housing whereby the bearing member is located radially but is left free for slight axial or tilting movement relatively thereto.

8. The combination with the features claimed in claim 7 of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

9. A spindle mounting as claimed in claim 1, in which the locating means comprises a spherical surface on the bearing member abutting radially against a surface of the housing whereby the bearing member is located radially but is left free for slight axial or tilting movement relatively thereto, and a balanced coupling in the housing for holding the bearing member against rotation relatively thereto, such coupling incorporating a floating member and means for coupling such member to the bearing member and to the housing whereby slight axial or tilting movement of the bearing member relatively to the housing is permitted and radial stresses are minimized.

10. The combination with the features claimed in claim 1, of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

11. An accurate spindle mounting for precision work comprising a rotary spindle having at each end a slightly tapered bearing surface, two bearing members carried by the spindle and each having a slightly tapered bearing surface in bearing engagement with one of the tapered bearing surfaces on the spindle, means carried wholly by the spindle for effecting accurate axial positioning of each bearing member on the spindle whereby the bearing members are prevented from moving axially in both directions relatively to the spindle, a fixed hollow housing surrounding the spindle and the bearing members, locating means in the housing for each bearing member permitting limited axial movement of the bearing member for radially and circumferentially positioning the bearing member in the housing, such locating means including radially abutting parts coacting in a single transverse plane between the bearing member and the housing whereby the bearing member is substantially held against radial movement in the housing but is left free for slight axial or tilting movement relatively thereto and circumferentially abutting parts in sliding engagement between the bearing member and the housing whereby the bearing member is held against rotation in the housing but is left free for slight axial or tilting movement relatively thereto, and an axial thrust bearing for the spindle mounted in the housing and separate from the two bearing members.

12. A spindle mounting as claimed in claim 11, in which each locating means includes in addition to the radially abutting parts for radially locating the bearing member, a balanced coupling for holding the bearing member against rotation relatively to the housing, such coupling incorporating a floating member and means for coupling such member to the bearing member and to the housing whereby slight relative axial movement between the bearing member and the housing is permitted and radial stresses are minimized.

13. A spindle mounting as claimed in claim 11, in which each locating means includes in addition to the circumferentially abutting parts for holding the bearing member against rotation, a ball cage carried by the housing and a ring of balls housed in such cage and abutting radially against the bearing member, whereby the bearing member is located radially in the housing but is left free for slight axial or tilting movement relatively thereto.

14. A spindle mounting as claimed in claim 11, in which each locating means includes in addition to the circumferentially abutting parts for holding the bearing member against rotation, a spherical surface on the bearing member abutting radially against a surface of the housing whereby the bearing member is located radially but is left free for slight axial or tilting movement relatively thereto.

15. The combination with the features claimed in claim 11, of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

16. An accurate spindle mounting for precision work comprising a rotary spindle having at one end a slightly tapered bearing surface and at the other end a spherical bearing surface, a bearing member carried by the spindle and having a slightly tapered bearing surface in bearing engagement with the tapered bearing surface on the spindle, means carried wholly by the spindle for effecting accurate axial positioning of the bearing member on the spindle whereby the bearing member is prevented from moving axially in both directions relatively to the spindle, a fixed hollow housing surrounding the spindle and the bearing member, locating means in the housing permitting limited axial movement of the bearing member for radially and circumferentially positioning the bearing member in the housing, such locating means including radially abutting parts coacting in a single transverse plane between the bearing member and the housing whereby the bearing member is substantially held against radial movement in the housing but is left free for slight axial or tilting movement relatively thereto and circumferentially abutting parts in sliding engagement between the bearing member and the housing whereby the bearing member is held against rotation in the housing but is left free for slight axial or tilting movement relatively thereto, and a member carried by the housing and having a spherical bearing surface in bearing engagement with the spherical bearing surface on the spindle whereby such cooperating spherical bearing surfaces not only effect accurate radial positioning of the said other end of the spindle in the housing but also afford an axial thrust bearing for the spindle.

17. A spindle mounting as claimed in claim 16, in which the locating means includes in addition to the radially abutting parts for radially locating the bearing member, a balanced coupling for holding the bearing member against rotation relatively to the housing, such coupling incorporating a floating member and means for coupling such member to the bearing member and to the housing whereby slight relative axial movement between the bearing member and the housing is permitted and radial stresses are minimized.

18. A spindle mounting as claimed in claim 16, in which the locating means includes in addition to the circumferentially abutting parts for holding the bearing member against rotation, a ball cage carried by the housing, and a ring of balls housed in such cage and abutting radially against the bearing member, whereby the bearing member is located radially in the housing but is left free for slight axial or tilting movement relatively thereto.

19. A spindle mounting as claimed in claim 16, in which the locating means includes in addition to the circumferentially abutting parts for holding the bearing member against rotation, a spherical surface on the bearing member abutting radially against a surface of the housing whereby the bearing member is located radially but is left free for slight axial or tilting movement relatively thereto.

20. The combination with the features claimed in claim 16 of a driving member, means for supporting the driving member on the fixed housing, a balanced coupling between such member and the spindle for transmitting substantially only a rotational torque to the spindle, and spring means interconnecting the driving member and the spindle for supporting at least part of the weight of the spindle and the parts carried thereby, the spindle being mounted vertically.

References Cited in the file of this patent
FOREIGN PATENTS
52,312    Austria _____ Feb. 26, 1912